US012583577B2

(12) United States Patent
Kim et al.

(10) Patent No.: US 12,583,577 B2
(45) Date of Patent: Mar. 24, 2026

(54) LANDING GEAR OF AIRCRAFT AND METHOD FOR TAKEOFF AND LANDING USING LANDING GEAR

(71) Applicants: HYUNDAI MOTOR COMPANY, Seoul (KR); KIA CORPORATION, Seoul (KR)

(72) Inventors: Choung Hyoung Kim, Anyang-si (KR); Jung Hyun Lee, Gunpo-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 65 days.

(21) Appl. No.: 18/643,046

(22) Filed: Apr. 23, 2024

(65) Prior Publication Data

US 2025/0346348 A1     Nov. 13, 2025

(30) Foreign Application Priority Data

Jul. 19, 2023     (KR) ........................ 10-2023-0093786

(51) Int. Cl.
| | |
|---|---|
| *B64C 25/36* | (2006.01) |
| *B64C 25/32* | (2006.01) |
| *B64C 25/42* | (2006.01) |
| *B60L 7/10* | (2006.01) |

(52) U.S. Cl.
CPC ............ *B64C 25/405* (2013.01); *B64C 25/36* (2013.01); *B64C 25/42* (2013.01); *B60L 7/10* (2013.01); *B60L 2200/10* (2013.01)

(58) Field of Classification Search
CPC ....... B64C 25/36; B64C 25/42; B64C 25/405; B60L 7/10; B60L 2200/10
See application file for complete search history.

(56) References Cited

U.S. PATENT DOCUMENTS

| | | | | |
|---|---|---|---|---|
| 4,223,255 | A * | 9/1980 | Goldman ............. | H02K 1/2795 |
| | | | | 318/400.41 |
| 9,457,896 | B2 * | 10/2016 | De Mers ............... | B64C 25/405 |
| 9,650,131 | B2 * | 5/2017 | Jaber ..................... | B60B 25/004 |
| 2005/0224642 | A1 * | 10/2005 | Sullivan ................... | B60L 7/26 |
| | | | | 244/111 |
| 2019/0168864 | A1 * | 6/2019 | Cox ........................ | B64C 25/50 |
| 2020/0407048 | A1 * | 12/2020 | Kismarton ............. | B64C 25/62 |

FOREIGN PATENT DOCUMENTS

| | | |
|---|---|---|
| CN | 113753225 A | 12/2021 |
| EP | 3342701 A1 | 7/2018 |
| JP | 2009-061837 A | 3/2009 |
| JP | 2014-515334 A | 6/2014 |
| JP | 2017-159907 A | 9/2017 |
| KR | 10-1200193 B1 | 11/2012 |

(Continued)

OTHER PUBLICATIONS

Extended European Search Report for EP Application No. 24174287, dated Sep. 27, 2024.

*Primary Examiner* — Tye William Abell
(74) *Attorney, Agent, or Firm* — MCDONNELL BOEHNEN HULBERT & BERGHOFF LLP

(57) ABSTRACT

A landing gear includes a wheel support portion connected to a fuselage of an aircraft, a wheel rotatably connected to the wheel support portion via a shaft, a stator mounted on the shaft, and a rotor mounted on the wheel spaced apart from the stator.

6 Claims, 5 Drawing Sheets

(56)             References Cited

FOREIGN PATENT DOCUMENTS

| KR | 2013-0006599 | A | 1/2013 |
|----|--------------|-----|---------|
| KR | 10-1485312 | B1 | 1/2015 |
| KR | 2016-0132383 | A | 11/2016 |
| WO | 2005/102839 | A2 | 11/2005 |
| WO | 2011/119283 | A1 | 9/2011 |
| WO | 2012/171589 | A1 | 12/2012 |
| WO | 2015/136302 | A1 | 9/2015 |

* cited by examiner

LANDING GEAR OF AIRCRAFT AND METHOD FOR TAKEOFF AND LANDING USING LANDING GEAR

CROSS REFERENCE TO RELATED APPLICATIONS

This application claims benefit of priority to Korean Patent Application No. 10-2023-0093786 filed on Jul. 19, 2023 in the Korean Intellectual Property Office, the disclosure of which is incorporated herein by reference in its entirety.

TECHNICAL FIELD

The present disclosure relates to a landing gear of an aircraft capable of providing auxiliary thrust during takeoff as well as driving force when the aircraft is taxiing, and a method for takeoff and landing using the same.

BACKGROUND

A commercial aircraft taxies from an airport gate to a runway before takeoff, or taxies from the runway to the gate after landing. For such taxiing, the aircraft may use thrust generated by driving an engine. In general, engines are not designed to operate efficiently at low power, such that an aircraft may consume a large amount of fuel during taxiing.

In order to optimize fuel use, a towing method has been performed in which an aircraft is taxied by pulling a nose landing gear with a tractor such as a towing car or taxi-bot. However, the towing method may place a load on the nose landing gear, which may lead to part fatigue or damage, and the associated frequent maintenance cycles and part replacement, and there is a limitation in that the towing method depends on airport infrastructure rather than the aircraft itself.

As an aircraft become increasingly electrified, an electric-powered aircraft using a battery as a power source has been researched and developed. For example, an aircraft may accelerate on the runway until it reaches lift-off speed. In this case, most power may be consumed. Therefore, a reduction in power required by a propulsion motor of the electric-powered aircraft during takeoff may increase a flight distance and improve efficiency.

SUMMARY

An aspect of the present disclosure provides a landing gear of an aircraft capable of providing auxiliary thrust during takeoff as well as driving force when the aircraft is taxiing, and a method for takeoff and landing using the same.

According to an aspect of the present disclosure, there is provided a landing gear including a wheel support portion connected to a fuselage of an aircraft, a wheel rotatably connected to the wheel support portion via a shaft, a stator mounted on the shaft, and a rotor mounted on the wheel to be spaced apart from the stator.

The stator and the rotor may be disposed in the wheel. When power is applied to the stator, the stator and the rotor may act as an in-wheel motor. When application of power to the stator is intermitted and torque is applied to the wheel, the stator and the rotor may act as a generator.

Thrust, generated when the stator and the rotor act as the in-wheel motor, may be provided as auxiliary thrust for taxiing or takeoff of the aircraft. Power, generated when the stator and the rotor act as the generator, may be charged to a power source, and regenerative braking of the wheel may be performed.

The stator may include a stator core fixed to the shaft while surrounding the shaft, and a plurality of coils wound on the stator core. The rotor may include a rotor core fixedly installed on the wheel, and a plurality of permanent magnets coupled to the rotor core. Power may be applied to the coil via a power supply line.

The wheel may include a disk portion having a hub at the center thereof, and a rim portion formed along an external front end of the disk portion. The shaft may be coupled to the hub to be rotatable, relative to the hub. A tire may be coupled to an external surface of the rim portion, and the rotor core may be installed on an internal surface of the rim portion.

The landing gear may further include a bearing disposed between the shaft and the hub.

The wheel support portion may include at least one support leg fixed to a lower portion of the fuselage. The support leg may have at least one curved portion. The wheel may be mounted on a lower end of the support leg via the shaft.

The wheel support portion may further include a connection portion connecting a pair of support legs to each other and connecting the support legs to the fuselage.

The landing gear may further include a controller installed on the fuselage to selectively control driving of the wheel. The controller may be connected to a power source and/or an inverter via a communication link to transmit a control signal.

An input unit to which a command is input by manipulation of a user may be electrically connected to the controller.

According to another aspect of the present disclosure, there is provided a method for takeoff and landing of an aircraft to which the above-described landing gear is applied, the method including taxiing, by the aircraft, up to a runway by receiving auxiliary thrust from a motor disposed in a wheel, and running, by the aircraft, on the runway and taking off by receiving main thrust from an engine or propulsion motor, together with the auxiliary thrust.

The method may further include running, by the aircraft, on the runway while performing regenerative braking using the motor immediately after touching down on the runway.

The method may further include taxiing, by the aircraft, to leave the runway by receiving auxiliary thrust from the motor.

The aircraft may include a plurality of landing gears. The landing gear may include a controller configured to selectively control driving of the wheel.

Braking of the wheel may be performed by the controller providing power, generated by regenerative braking of a wheel on one side, to an in-wheel motor of the wheel on the other side, and controlling the wheel on the other side to rotate in reverse.

Braking of the wheel may be performed by the controller applying power for rotation in reverse to a plurality of wheels such that the in-wheel motor act in a direction opposite to that of rotation of the wheel.

Steering of the wheel may be performed by the controller performing control such that power for rotation in a forward direction is applied to an in-wheel motor of a wheel on one side, among left and right wheels, and power for rotation in a reverse direction is applied to an in-wheel motor of the wheel on the other side.

Steering of the wheel may be performed by the controller performing control such that power is applied to an in-wheel motor of a wheel on one side, among left and right wheels, and intermitting application of power to stop the wheel on the other side.

Steering of the wheel may be performed by the controller controlling in-wheel motors of left and right wheels to rotate at different speeds and in the same direction.

According to an example embodiment of the present disclosure, taxiing of an aircraft operated at relatively low speeds may be efficiently performed, thereby providing convenience for passenger transportation and cargo transportation without airport infrastructure, and reducing noise forming operational restrictions and increasing a flight distance of the aircraft.

In addition, according to an example embodiment of the present disclosure, momentum may be directly transmitted from a motor to a wheel in terms of power transmission, thereby reducing fuel consumption and avoiding loss of thrust.

In addition, according to an example embodiment of the present disclosure, thrust of an engine or a propulsion motor may be assisted during takeoff, thereby simplifying a shape of the aircraft in terms of aerodynamics, and reducing a size of the engine or propulsion motor relative to performance.

In addition, according to an example embodiment of the present disclosure, braking force may be applied to wheels during landing, thereby minimizing a landing distance of the aircraft. When the wheels land in a rolling motion, a landing gear may act as a generator to charge an energy source, thereby providing efficient energy operation.

BRIEF DESCRIPTION OF THE FIGURES

The above and other aspects, features, and advantages of the present disclosure will be more clearly understood from the following detailed description, taken in conjunction with the accompanying drawings, in which.

DETAILED DESCRIPTION

Figure 1:
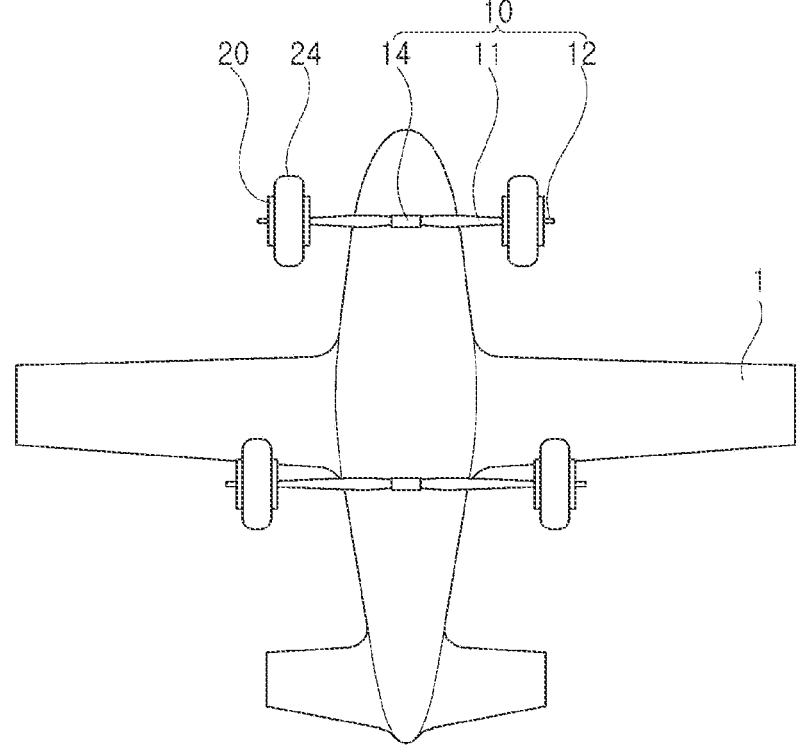
FIG. 1 is a bottom view illustrating an aircraft to which a landing gear is applied according to an example embodiment of the present disclosure.

Hereinafter, the present disclosure will be described in detail with reference to exemplary drawings. In adding reference numerals to components of each drawing, it should be noted that the same components are indicated by the same numerals even though displayed on different drawings.

Figure 2:
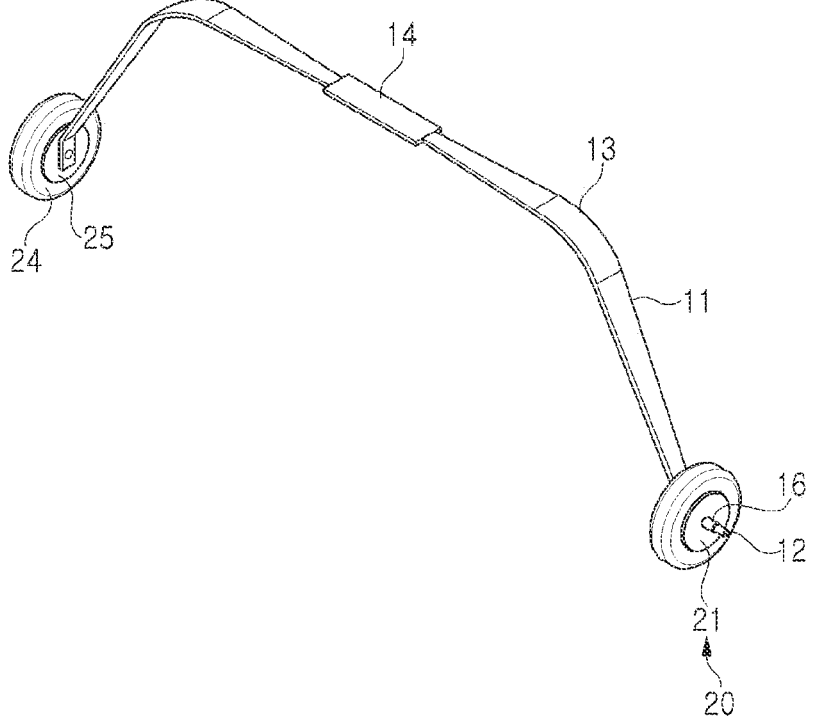
FIG. 2 is a perspective view illustrating a landing gear according to an example embodiment of the present disclosure.
Figure 3:
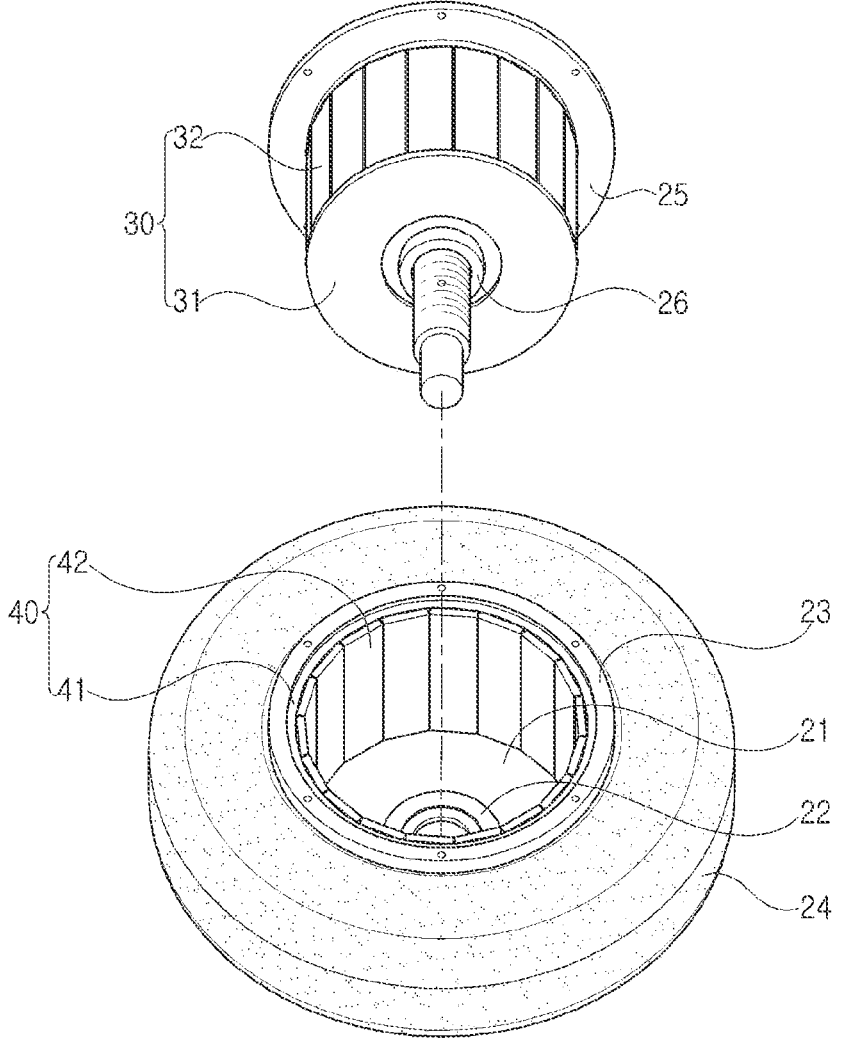
FIG. 3 is an exploded perspective view illustrating the wheel illustrated in FIG. 2.

FIG. 1 is a bottom view illustrating an aircraft to which a landing gear is applied according to an example embodiment of the present disclosure. FIG. 2 is a perspective view illustrating a landing gear according to an example embodiment of the present disclosure. FIG. 3 is an exploded perspective view illustrating the wheel illustrated in FIG. 2.

A landing gear according to an example embodiment of the present disclosure may include a wheel support portion 10, a wheel 20, a stator 30, and a rotor 40.

First, as used herein, the aircraft 1 may refer to a mobility vehicle capable of moving by flying in the sky. In other words, the aircraft may refer to not only a fixed-wing aircraft, but also a drone, a tilt-rotor aircraft, a vertical takeoff and landing aircraft, and a rotary-wing aircraft, and may also include all vehicles capable of landing and travelling on the ground or a structure using a landing gear after flight.

In addition, the aircraft 1 may include a manned aircraft and an unmanned aircraft. The manned aircraft may include a fuselage capable of autonomously flying in addition to a fuselage controlled by a pilot.

For ease of description, an example in which a landing gear according to an example embodiment of the present disclosure is applied to a fixed-wing aircraft taking off by running on a runway having a predetermined length and stopping while running on the runway after flight will be described and illustrated. However, examples in which the landing gear according to an example embodiment of the present disclosure is applied are not necessarily limited thereto.

The landing gear according to an example embodiment of the present disclosure may be provided in a plurality of pairs and disposed at the front and rear of the aircraft 1, and a plurality of landing gears forming one pair may be symmetrically disposed on left and right sides of the fuselage. In other words, the aircraft may include four landing gears.

However, the arrangement and number of landing gears are not limited to the example described above and illustrated. For example, one landing gear may be disposed on a central portion between the left and right sides of the fuselage at the front or rear of the aircraft 1, and two landing gears may be symmetrically disposed on the left and right sides of the fuselage at the relatively rear or front of the landing gear disposed on the central portion. That is, in this case, the aircraft may include three landing gears.

The wheel support portion 10 may include at least one support leg 11 fixed to a lower portion of the fuselage of the aircraft 1, and the wheel 20 may be mounted on a lower end of the support leg via a shaft 12.

The support leg 11 may be formed of a material such as metal or plastic so as to secure sufficient strength and effectively absorb impact energy by elastic deformation.

The support leg 11 may be formed to have a generally thin and long shape. In addition, the support leg may have a cross-sectional shape, such as a circular shape, an oval shape, or a polygonal shape such as a rectangular shape.

The support leg 11 may have a hollow portion. In addition, the support leg 11 may have at least one curved portion 13. The support leg 11 having the hollow portion and the curved portion may increase the effect of absorbing impact energy.

The support leg 11 configured in such a manner may be elastically deformed by impact energy applied to the wheel 20 when the aircraft 1 lands, such that the impact energy may be converted into strain energy and absorbed. That is, in the landing gear, the support leg may perform a function of absorbing impact energy during landing.

The support leg 11 may need to be designed to primarily absorb impact energy in a vertical direction by elastic deformation during landing. One of the physical properties of the landing gear may be "vertical stiffness," which may be important in attenuating impact energy during landing.

Damping behavior of the support leg 11 may appear as a result of the vertical stiffness of the support leg. The material and cross-sectional shape of the support leg may affect the vertical stiffness.

An upper end of the support leg 11 may be coupled to the fuselage of the aircraft 1 by a fastener such as a screw, rivet, or the like, such that the wheel support portion 10 may be installed to extend from the fuselage in the form of a cantilever.

Optionally, the wheel support portion 10 may further include a connection portion 14 connecting a pair of support legs 11 to each other and connecting the support legs to the fuselage of the aircraft 1. The pair of support legs and the connection portion may be integrally formed, or an upper end of each support leg may be integrally coupled to both ends of the connection portion by junction, such as welding.

The wheel support portion 10 including the pair of support legs 11 and the connection portion 14 may be coupled to the fuselage of the aircraft 1 by a fastener such as a screw or rivet via the connection portion.

As described above, the wheel 20 may be installed on the shaft 12 provided at the lower end of the support leg 11 included in the wheel support portion 10. The shaft, a member rotatably supporting the wheel, may protrude to extend from the lower end of the support leg to a side of the fuselage, and may be fixed.

The wheel 20 may include a disk portion 21 having a hub 22 at the center thereof, and a rim portion 23 formed along an external edge of the disk portion.

The shaft 12 may be coupled to the hub 22 of the disk portion 21 to be rotatable, relative to the hub 22. In addition, one end of the shaft may have a thread formed on an outer peripheral surface thereof, and a nut 16 may be fastened to the one end of the shaft after the one end of the shaft is inserted into and passes through the hub.

A tire 24 may be detachably coupled to an external surface of the circular rim portion 23, and may rotate together with rotation of the rim portion, that is, the wheel 20. A separation prevention bump may be further provided on the external surface of the rim portion to maintain a state in which the tire is mounted.

The stator 30 and the rotor 40 may form an in-wheel motor in the landing gear according to an example embodiment of the present disclosure. The stator and rotor may be disposed in the wheel 20. The wheel may have a predetermined accommodation space, partitioned by the disk portion 21 and the rim portion 23, therein, and components including the shaft 12, the stator, the rotor, and the like may be disposed and embedded in the accommodation space.

The stator 30 may be fixedly disposed on a circumference of the shaft 12 with respect to the shaft 12. In other words, the shaft may be fixedly connected through the center of the stator.

Specifically, the stator 30 may include a stator core 31 fixed to the shaft 12 in a press-fit manner while surrounding the shaft 12 in the wheel 20, and a plurality of coils 32 wound on the stator core. The plurality of coils may be disposed in a circumferential direction along a circumference of the stator core.

The stator 30 may receive power necessary to drive the in-wheel motor from the outside of the wheel 20 via a power supply line. For example, the power supply line may be inserted through a hollow portion formed in a portion of the shaft 12 to be connected to the coil 32 of the stator, or may be inserted through a space between the shaft and the rim portion 23 to be connected to the coil of the stator.

The rotor 40 may be disposed to surround the stator 30 while being spaced apart from the stator 30 at a predetermined distance. However, the arrangement of the rotor with respect to the stator is not necessarily limited thereto, and for example, the stator may be disposed to surround the rotor. As a result, when power is supplied to the stator, the rotor may rotate with respect to the stator.

Specifically, the rotor 40 may include a rotor core 41 fixedly installed on an internal surface of the rim portion 23 of the wheel 20 and a plurality of permanent magnets 42 coupled to the rotor core. For example, a plurality of grooves may be formed along an inner circumference of the rotor core, and a permanent magnet may be inserted to and fixed to each groove. As a result, the plurality of permanent magnets may be disposed to oppose the plurality of coils 32 of the stator 30.

When power is applied to the stator 30, that is, to the coil 32 of the stator, via the power supply line, electromagnetic force may be generated between the coil and the permanent magnet 42 of the rotor 40. The rotor may rotate with respect to the stator fixed to the shaft 12 using the electromagnetic force.

When the rotor 40 rotates in such a manner, the rim portion 23 of the wheel 20 having the internal surface to which the rotor is fixedly connected may rotate. Due to rotation of the rim portion, the tire 23 mounted on the external surface of the rim portion may rotate using the shaft 12 fixed to the wheel support portion 10 as a central axis.

The wheel 20 may further include a cover 25 coupled to the rim portion 23 to cover an open portion of the wheel and sealing an interior of the wheel. The cover may seal the interior of the wheel from the outside to prevent moisture or foreign substances from entering the accommodation space of the wheel, and to protect the components disposed in the accommodation space.

The cover 25 may be formed to have a substantially disk shape, and may be coupled to an open edge of the rim portion 23 by, for example, bolting. A through-hole may be provided in the center of the cover, such that the shaft 12 may pass through the center of the cover to be coupled to the wheel 20 and the stator 30. As a result, the shaft may be disposed to pass through the center of each of the disc portion 21 and the cover of the wheel.

The landing gear according to an example embodiment of the present disclosure may further include a bearing 26 disposed between the shaft 12 and the wheel 20. Specifically, the bearing may be disposed at least between the shaft and the hub 22 of the disk portion 21.

Optionally, a bearing seat having a substantially cylindrical shape may be provided on the hub 22 of the disk portion 21. At least one bearing 26 may be mounted in the bearing seat, and an outer ring of the bearing may be press-fitted into an internal surface of the bearing seat. In addition, the shaft 12 may be press-fitted into an inner ring of the bearing. The rotor 40 may be fixedly connected to the rim portion 23 of the wheel 20, such that the wheel and disk portion 21 may also rotate as the rotor rotates.

When the wheel 20 includes the cover 25, a bearing (not illustrated) may be disposed between the shaft 12 and the through-hole of the cover. The rotor 40 may be fixedly connected to the rim portion 23 of the wheel 20, such that the cover may rotate together with the wheel as the rotor rotates.

The bearing 26 may reduce contact friction between the shaft 12 and the disk portion 21 or between the shaft 12 and the cover 25 when the wheel 20 rotates, thereby allowing the wheel to smoothly rotate.

Optionally, the landing gear according to an example embodiment of the present disclosure may further include a reducer (not illustrated) disposed between the shaft 12 and the wheel 20 to adjust rotational speed of the wheel. For example, the reducer may include a sun gear, a planet gear, a carrier, and the like, and may further include a counter gear, a rotation axis, a bearing, and the like.

However, a configuration of the reducer is not necessarily limited to the above-described example, and may be applied to the landing gear of the present disclosure as long as a desired reduction ratio is obtainable by appropriately disposing any gears.

Figure 4:
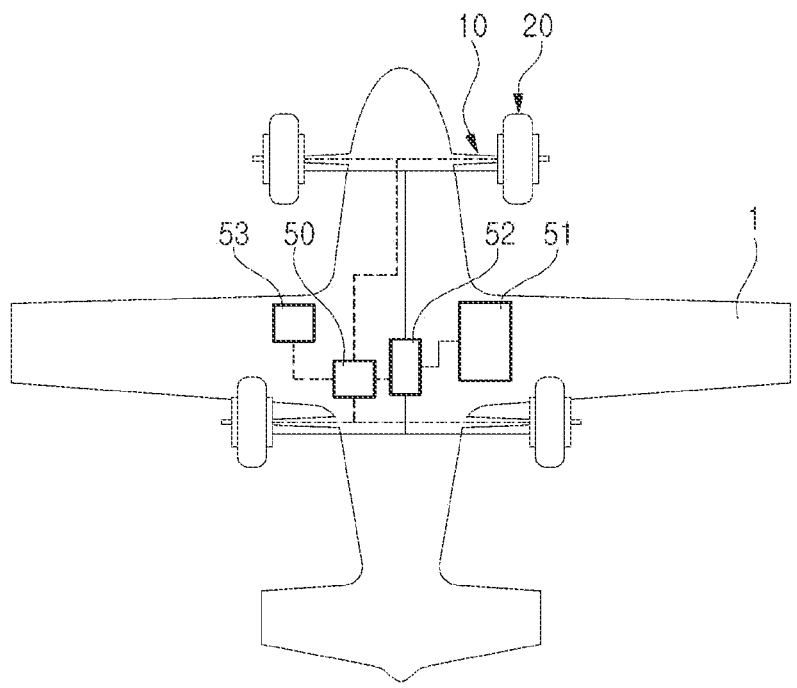
FIG. 4 is a schematic diagram illustrating a control relationship of an aircraft to which a landing gear is applied according to an example embodiment of the present disclosure.

FIG. 4 is a schematic diagram illustrating a control relationship of an aircraft to which a landing gear is applied according to an example embodiment of the present disclosure.

The landing gear according to an example embodiment of the present disclosure may further include a controller 50 installed on the fuselage of the aircraft 1 and selectively controlling driving of the wheel 20. The controller may be electrically connected to a power source 51 and/or an inverter 52 to output a control signal to control operation or stopping of the in-wheel motor.

In FIG. 4, dotted lines connected to the controller 50 may represent control signals, and solid lines drawn from the power source 51 and the inverter 52 may represent power supply lines.

Specifically, the controller 50 may include a plurality of electrical and electronic components providing power and operational control to parts related to the in-wheel motor, for example, the coils 32 of the stator 30. For example, the controller may be implemented as various programmable processing units, such as a microprocessor with a built-in semiconductor chip or memory capable of performing various operations or commands. The controller may be merged into a higher-level control system of the aircraft 1 or may be used in conjunction with the higher-level control system.

The controller 50 may transmit a control signal regarding application or intermitting of power necessary for operation of the wheel 20 to the power source 51 and/or the inverter 52 via a communication link. As the communication link, for example, wireless communication such as a local area network may be used, but the present disclosure is not necessarily limited thereto, and wired, wired/wireless, or optical communication may also be applied.

A battery may be used as the power source 51, and may be electrically connected to each component of the aircraft 1 to supply electricity. As the battery, various types of batteries, such as lithium-ion batteries and all-solid-state batteries may be used.

The inverter 52 may act as a power conversion means, and may, for example, convert and supply direct current power from a battery into alternating current power required by the in-wheel motor.

In addition, an input unit 53 to which a command is input by manipulation of a user may be electrically connected to the controller 50. The input unit may output a signal corresponding to the user's manipulation, motion, or voice. The controller may operate or stop the in-wheel motor by controlling power supply from the power source 51 and the inverter 52 in accordance with the signal received from the input unit.

The input unit 53 may be implemented as a scroll wheel, a button, a knob, a touch screen, a touch pad, a lever, a track ball, a handle, or the like that may be manipulated by the user, or may be implemented as at least one of a motion recognition sensor or a voice recognition sensor sensing a motion or voice of a human, or a combination thereof.

For example, based on the user's manipulation of the input unit 53, or the like, the controller 50 may operate the in-wheel motor, thereby allowing the wheel 20 of the landing gear to perform taxiing, propulsion assistance, braking, steering, or the like of the aircraft 1.

In such a manner, the in-wheel motor may be formed in the wheel 20 of the landing gear according to an example embodiment of the present disclosure, such that a complicated driving device or power transmission device may not be necessary, thereby simplifying a structure, reducing a weight, and providing a landing gear capable of reducing energy loss caused during power transmission.

In the wheel 20 of the landing gear according to an example embodiment of the present disclosure, when the controller 50 starts driving control of the in-wheel motor for taxiing and/or takeoff based on the user's manipulation or the like, power may be applied to the coil 32 of the stator 30 from the power source 51 and the inverter 52, such that the rotor 40 may be driven to rotate.

When a reducer is provided, reduced rotation of the reducer may be transmitted to the wheel 20, such that the tire 24, mounted on an external surface of the wheel, may rotate using the shaft 12 of the wheel support portion 10 as a central axis.

Conversely, for example, when the controller 50 intermits application of power to the stator 30 of the wheel 20 used as the in-wheel motor immediately after landing, torque caused by inertia force or friction force may be applied, such that the wheel may be driven to rotate. As the rotor 40, fixedly connected to the rim portion 23 of the wheel, rotates, back electromotive force may be applied to the stator, such that regenerative braking may be performed simultaneously with charging for supplying power to the power source 51 through the inverter 52 or the like. In other words, during landing, the in-wheel motor may be used as a generator and a regenerative braking device.

In the landing gear according to an example embodiment of the present disclosure, for example, the controller 50 may provide power generated by regenerative braking of relatively forward wheels to an in-wheel motor of relatively backward wheels, and control the in-wheel motor to act in a direction opposite to that of rotation of the wheel, that is, to rotate the wheel in reverse. As a result, breaking force may be increased to perform braking of the wheel 20.

Alternatively, braking may be achieved by the controller 50 applying power for rotation in reverse to all the wheels 20 such that the in-wheel motor act in a direction opposite to that of rotation of the wheel.

Optionally, a friction braking device may be added to the wheel, as necessary. In this case, friction braking and regenerative braking may be combined, thereby not only increasing a lifespan and promoting usefulness of the friction braking device, but also reducing a wear rate and the number of friction discs required to reduce maintenance costs.

In the landing gear according to an example embodiment of the present disclosure, for example, the controller 50 may control power to be applied to rotate in a forward direction to an in-wheel motor of a wheel on one side, among left and right wheels, and control power to be applied to rotate in a reverse direction to an in-wheel motor of the wheel on the other side. As a result, steering of the wheels 20 may be performed.

Here, the forward direction may refer to a direction of rotation of the wheel 20 moving the aircraft 1 forward, and the reverse direction may refer to a direction of rotation of the wheel moving the aircraft backward.

In this case, two or more wheels 20 may provide steering of the aircraft only when the tire 24 in physical contact with the ground provides torque required to steer the wheel without any forward or backward movement of the aircraft 1.

Alternatively, for example, steering may be performed even when the controller 50 performs control such that power for rotation in a forward direction is applied to in-wheel motors of wheels on one side, among left and right wheels, and intermits application of power to stop the wheels on the other side.

Accordingly, through an input based on the user's manipulation or the like, the landing gear including the wheel 20 and ultimately the aircraft 1 may be positioned in a desired place, and orientation of the aircraft may be adjusted.

Optionally, in-wheel motors of respective wheels 20 may rotate at different speeds and in the same direction. In a state in which the aircraft 1 moves forward or backward, when the user's manipulation or the like is input, power may be differentially applied to the in-wheel motors of the wheels, such that both tires 24 of left and right wheels in contact with the ground while the aircraft is moving may rotate in the same direction, and a wheel on one side, among the left or right wheel, may rotate more rapidly than the wheel on the other side. Accordingly, the aircraft may be steered in a desired direction.

In a method of steering the wheel 20 using an in-wheel motor, two or more wheels may rotate in the same direction and/or in opposite directions while orientation thereof is fixed, thereby improving maneuverability and reducing a turning radius or runway width required to steer the aircraft 10 on the ground. In addition, a smaller runway may be used in an emergency situation, and fuel consumption may be reduced.

Figure 5:
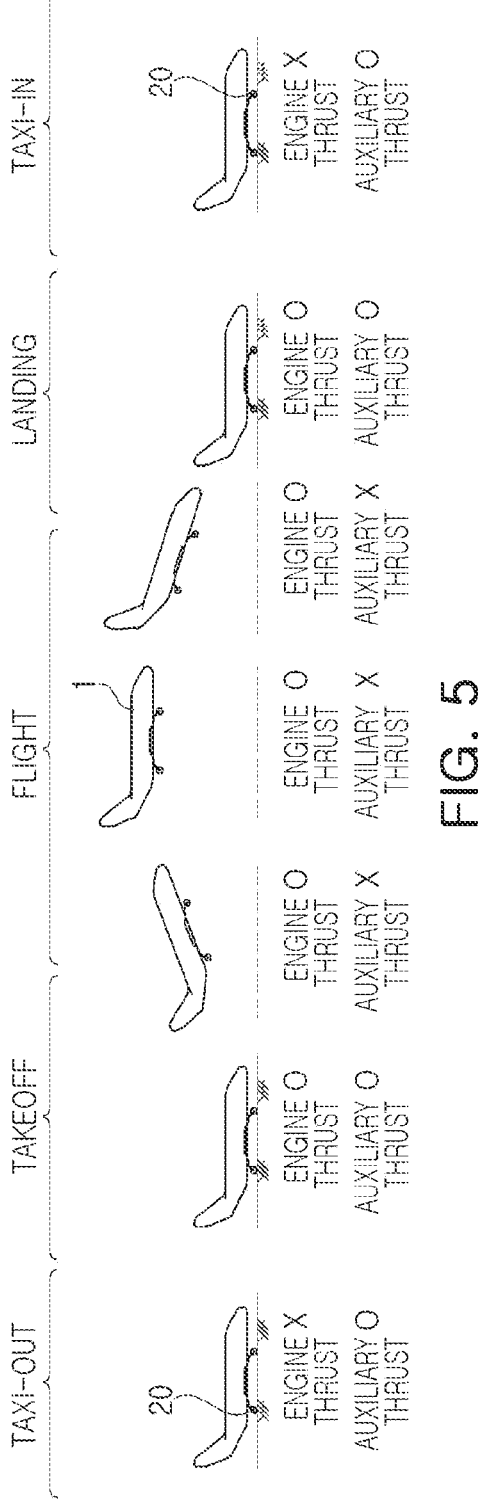
FIG. 5 is a diagram illustrating a method for takeoff and landing of an aircraft using a landing gear according to an example embodiment of the present disclosure.

FIG. 5 is a diagram illustrating a method for takeoff and landing of an aircraft using a landing gear according to an example embodiment of the present disclosure.

First, the aircraft 1 to which the landing gear is applied according to an example embodiment of the present disclosure may include an engine or propulsion motor installed on the fuselage and connected to a propeller or ducted fan. In addition, as described above, the wheel 20 forming each landing gear may be equipped with a motor, specifically an in-wheel motor.

Accordingly, the aircraft 1 may receive main thrust from the engine or propulsion motor, and may receive auxiliary thrust from the motor mounted on the wheel 20.

A method for takeoff and landing of an aircraft using a landing gear according to an example embodiment of the present disclosure may include taxiing, by an aircraft 1, up to a runway by receiving auxiliary thrust from a motor disposed in a wheel 20, and running, by the aircraft, on the runway and taking off by receiving main thrust from an engine or propulsion motor, together with the auxiliary thrust.

In addition, the method for takeoff and landing of an aircraft using a landing gear according to an example embodiment of the present disclosure may include running, by the aircraft 1, on the runway while performing regenerative braking using the motor mounted on the wheel 20 immediately after touching down on the runway, and taxiing, by the aircraft, to leave the runway by receiving auxiliary thrust from the motor mounted on wheel.

During block time of the aircraft 1, an in-wheel motor forming the landing gear according to an example embodiment of the present disclosure may be controlled to operate during taxi-in and taxi-out operated at relatively low speeds, and during takeoff so as to assist propulsion. In addition, during landing, the in-wheel motor may be operated so as to perform regenerative braking simultaneously with charging.

Here, the block time may refer to total time from the moment the aircraft 1 first moves for the purpose of flight until the moment it finally comes to rest at the end of the flight. The block time may refer to time from ramp-out to ramp-in, and thus may include flight as well as taxi-in and taxi-out.

More specifically, the aircraft 1 may taxi out for about 10 minutes. In this case, the in-wheel motor may operate to rotate the tire 24, allowing the aircraft to perform forward or backward movement and steering.

Engine efficiency of the aircraft 1 may be designed to increase with increased speed, such that taxiing of an aircraft moving at very low speeds may be inefficient. However, the landing gear according to an example embodiment of the present disclosure may enable the aircraft to taxi without the engine or propulsion motor with an amount of output of the in-wheel motor, thereby minimizing fuel consumption and alleviating inefficiency in operation of the engine or propulsion motor.

In addition, the electrically driven wheel 20 may reduce or eliminating the need for airport infrastructure, such as a tractor or the like, conventionally used to support taxiing and takeoff or landing.

During takeoff, the aircraft 1 may accelerate while running on the runway until the aircraft 1 reaches lift-off speed, and may consume most power during such acceleration.

Through an input based on the user's manipulation or the like, the controller 50 may control the engine or propulsion motor to operate. At the same time, the controller 50 may perform control such that power for rotation in a forward direction is applied to the in-wheel motor.

Thus, in addition to main thrust provided from the engine or propulsion motor, propulsion may be assisted by the in-wheel motor, thereby allowing the aircraft 1 to run on the runway more rapidly than a case in which the engine or propulsion motor is used alone.

As a result, power and fuel consumption necessary for takeoff of the aircraft 1 may be reduced, while a length of the runway necessary for takeoff may be reduced.

During flight, the aircraft 1 may operate only with main thrust provided from the engine or propulsion motor.

Immediately after the aircraft 1 touches down on the runway, the controller 50 may control the in-wheel motor such that regenerative braking is performed simultaneously with charging the power source 51 from the in-wheel motor while intermitting application of power to the stator 30 of the wheel 20. In addition, the engine or propulsion motor may be propelled in reverse to minimize a landing distance of the aircraft.

After a few minutes, charged electrical energy may be applied to the in-wheel motor through the controller 50 to allow the in-wheel motor to act in a direction opposite to that of rotation of the wheel 20, thereby achieving deceleration or braking.

Subsequently, the aircraft 1 may perform taxi-in to leave the runway. In this case, the in-wheel motor may operate to rotate the tire 24, allowing the aircraft to perform forward or backward movement and steering.

After braking by the in-wheel motor is performed until there is no movement of the aircraft 1, the controller 50 may control the in-wheel motor to apply power to the coil 32 of the stator 30 such that attractive force acts on the permanent magnet 42 of the rotor 40, thereby allowing the aircraft to be parked at a gate.

In such a manner, during landing, the in-wheel motor may act as a generator and a regenerative braking device to charge a power source of the landing gear, and may be used as part of electrical energy during deceleration or taxiing, thereby performing efficient energy operation.

As described above, according to an example embodiment of the present disclosure, taxiing of an aircraft operated at relatively low speeds may be efficiently performed, thereby providing convenience for passenger transportation and cargo transportation without airport infrastructure, and reducing noise forming operational restrictions and increasing a flight distance of the aircraft.

In addition, according to an example embodiment of the present disclosure, momentum may be directly transmitted from a motor to a wheel in terms of power transmission, thereby reducing fuel consumption and avoiding loss of thrust.

In addition, according to an example embodiment of the present disclosure, thrust of an engine or a propulsion motor may be assisted during takeoff, thereby simplifying a shape of the aircraft in terms of aerodynamics, and reducing a size of the engine or propulsion motor relative to performance.

In addition, according to an example embodiment of the present disclosure, braking force may be applied to wheels during landing, thereby minimizing a landing distance of the aircraft. When the wheels land in a rolling motion, a landing gear may act as a generator to charge an energy source, thereby providing efficient energy operation.

While example embodiments have been shown and described above, it will be apparent to those skilled in the art that modifications and variations could be made without departing from the scope of the present disclosure as defined by the appended claims.

The invention claimed is:

1. A method for takeoff and landing of an aircraft, the aircraft including a plurality of landing gear, wherein each of the plurality of landing gear comprises a plurality of wheels each having an in-wheel motor therein and a control unit configured to control driving of the plurality of wheels, the method comprising:

taxiing, by the aircraft, up to a runway by receiving auxiliary thrust from a motor positioned in the wheel;

running, by the aircraft, on the runway and taking off by receiving main thrust from an engine or propulsion motor, together with the auxiliary thrust; and running, by the aircraft, on the runway while performing regenerative braking controlled by the controller and using the in-wheel motor immediately after touching down on the runway;

wherein the controller provides power generated by regenerative braking of a forward wheel of the plurality of wheels to an in-wheel motor of a backward wheel of the plurality of wheels, and controls the backward wheel to rotate in reverse; or wherein the controller provides power generated by regenerative braking of a backward wheel of the plurality of wheels to an in-wheel motor of a forward wheel of the plurality of wheels, and controls the forward wheel to rotate in reverse.

2. The method of claim 1, further comprising:

taxiing, by the aircraft, to leave the runway by receiving auxiliary thrust from the motor.

3. The method of claim 1, wherein steering of the wheel is performed by the controller such that power for rotation in a forward direction is applied to an in-wheel motor of a wheel on one side of the wheel, among first and second wheels, and power for rotation in a reverse direction is applied to an in-wheel motor of the wheel on another side of the wheel.

4. The method of claim 1, wherein steering of the wheel is performed by the controller such that power is applied to an in-wheel motor of a wheel on one side of the wheel, among first and second wheels, and intermittent application of power to stop the wheel on another side of the wheel.

5. The method of claim 1, wherein steering of the wheel is performed by the controller controlling in-wheel motors of first and second wheels to rotate at different speeds and in the same direction.

6. A method for takeoff and landing of an aircraft, the aircraft including a plurality of landing gear, wherein each of the plurality of landing gear comprises a plurality of wheels each having an in-wheel motor therein and a control unit configured to control driving of the wheels, the method comprising:

taxiing, by the aircraft, up to a runway by receiving auxiliary thrust from the in-wheel motor positioned in the wheel;

running, by the aircraft, on the runway and taking off by receiving main thrust from an engine or propulsion motor, together with the auxiliary thrust; and running, by the aircraft, on the runway while performing regenerative braking controlled by the controller and using the in-wheel motor immediately after touching down on the runway:

wherein braking of the wheel is performed by the controller applying power for rotation in reverse to a plurality of wheels such that the in-wheel motor acts in a direction opposite to a direction of rotation of the plurality of wheels.

\* \* \* \* \*